United States Patent
Ganesan et al.

(10) Patent No.: US 9,442,750 B2
(45) Date of Patent: Sep. 13, 2016

(54) SYSTEMS AND METHODS FOR COLOCATING VIRTUAL MACHINES ON ONE OR MORE PHYSICAL INFRASTRUCTURE

(71) Applicant: Infosys Limited, Bangalore (IN)

(72) Inventors: Rajeshwari Ganesan, Bangalore (IN); Geetika Goel, Bangalore (IN); Santonu Sarkar, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/493,905

(22) Filed: Sep. 23, 2014

(65) Prior Publication Data

US 2015/0089501 A1    Mar. 26, 2015

(30) Foreign Application Priority Data

Sep. 23, 2013  (IN) .......................... 4295/CHE/2013

(51) Int. Cl.
*G06F 9/45* (2006.01)
*G06F 9/455* (2006.01)
*G06F 9/50* (2006.01)

(52) U.S. Cl.
CPC ......... *G06F 9/45533* (2013.01); *G06F 9/5077* (2013.01); *G06F 9/5083* (2013.01); *G06F 2009/4557* (2013.01); *G06F 2209/5022* (2013.01)

(58) Field of Classification Search
None
See application file for complete search history.

(56) References Cited

U.S. PATENT DOCUMENTS

2011/0302578 A1   12/2011  Isci et al.
2013/0305092 A1*  11/2013  Jayachandran ..... G06F 11/0754
                                                        714/37

OTHER PUBLICATIONS

Ishakian, V., et al., "Morphosys: Efficient Colocation of QoS-Contrained Workloads in the Cloud", Computer Science Department, Boston University, Jan. 27, 2011, pgs. 1-10.
Sindelar M., et al., "Sharing-Aware Algorithms for Virtual Machine Colocation", SPAA'11, Jun. 4-6, 2011, pgs. 1-11, San Jose, California, USA.
Brooks P., et a., Interpreting the clinical significance of the differential inhibition of cyclox.
Li W., "Virtual Machine Placement in Cloud Environments", Liventiate Thesis, May 2012, Department of Computing Science, Umea University, pgs. 1-74.

* cited by examiner

*Primary Examiner* — Chuck Kendall
(74) *Attorney, Agent, or Firm* — LeClairRyan, a Professional Corporation

(57) ABSTRACT

This technology relates to a device and method for determining co-locatability of a plurality of virtual machines on one or more physical infrastructures. The plurality of virtual machines hosts a plurality of workloads. This involves identifying workloads which have high variability from the time series data and determining the workload capacity threshold of the identified workloads. Thereafter, the candidate workloads are selected among the identified workloads to colocate on a virtual machine based on the workload variability. After that, the total capacity required by each candidate workload pair to meet the service requirement is determined based on the workload capacity threshold. Then, an optimal sharing point of each workload of the pair with respect to the other workload of the pair is identified. Further, percentage compatibility of each workload pair is determined and finally, the candidate workloads are colocated based on the optimal sharing point and percentage compatibility.

22 Claims, 4 Drawing Sheets

SYSTEMS AND METHODS FOR COLOCATING VIRTUAL MACHINES ON ONE OR MORE PHYSICAL INFRASTRUCTURE

This application claims the benefit of Indian Patent Application Filing No. 4295/CHE/2013, filed Sep. 23, 2013, which is hereby incorporated by reference in its entirety.

FIELD

This technology generally relates to efficient resource allocation in virtualized environment and, in particular, to a system and method for determining co-locatability of a plurality of virtual machines on one or more physical infrastructures.

BACKGROUND

Virtualization technology is a disruptive business model that can drive significant cost savings. In a virtualized data center a single server hosts multiple workloads each running on a separate virtual machines (VMs). Virtualization software allow partitioning and sharing of computational resource of a server among different VMs. Partitioning of resources is useful to ensure the performance isolation among the VMs and resource shaping happens by multiplexing the workload of different VMs. Present virtualized environment hosting multiple physical machines and multiple workloads are faced with the challenge of appropriately sizing and placing of the VMs that host them on the physical infrastructure.

There are existing models and methods to address the optimal VM resource allocation. But these have a major drawback. All the existing approaches assume a fixed threshold above which the sharing possibilities between workloads are computed. This fixed threshold value assumption results in sub-optimal solution, as the opportunities of sharing based on the time varying nature of co-located workload is never exploited fully.

SUMMARY

This technology overcomes the above mentioned limitations by determining a sharing point, i.e. a percentile of workload above which the workloads share capacity with each other, for each workload with respect to another, rather than the value being fixed at a specific load percentile.

An example of a method for determining co-locatability of a plurality of virtual machines on one or more physical infrastructures is disclosed herein. In various examples the plurality of virtual machines host a plurality of workloads. The method includes identifying variability of the plurality of workloads running on the plurality of virtual machines from time series data. Workload capacity threshold of the plurality of workloads is determined based on one or more service requirements. Thereafter, total capacity required by each pair of the plurality of workloads running on the two or more candidate virtual machines at a given time period to meet the one or more service requirements is determined based on the workload capacity threshold. After that, an optimal sharing point is identified for each workload of the pair of the plurality of workloads running on the two or more candidate virtual machines with respect to another workload of the pair based on the required total capacity of the pair. Thereafter, the two or more candidate virtual machines are colocated n the one or more physical infrastructures based on the optimal sharing point. Additionally, percentage compatibility of each pair of the plurality of workloads running on the two or more candidate virtual machines is determined based on the optimal sharing point. This percentage compatibility can also be used at the collocation step. In accordance to one embodiment of the present disclosure, a co-locatability report is generated.

In another example a system for determining co-locatability of a plurality of virtual machines on one or more physical infrastructures is disclosed. In various examples the plurality of virtual machines host a plurality of workloads. The system includes a workload variability identification module, a workload capacity threshold determination module, a candidate virtual machine selection module, a total capacity determination module, an optimal sharing point identification module, a percentage compatibility determination module, a colocation module and a report generation module. The workload variability identification module is configured to identify variability of the plurality of workloads running on the plurality of virtual machines from time series data. The workload capacity threshold determination module is configured to determine workload capacity threshold of the plurality of workloads based on one or more service requirements. The candidate virtual machine selection module is configured to select two or more candidate virtual machines among the plurality of virtual machines for co-locating based on the variability of the plurality of workloads running on the plurality of virtual machines. The total capacity determination module is configured to determine total capacity required by each pair of the plurality of workloads running on the two or more candidate virtual machines at a given time period to meet the one or more service requirements based on the workload capacity threshold. The optimal sharing point identification module is configured to identify an optimal sharing point for each workload of the pair of the plurality of workloads running on the two or more candidate virtual machines with respect to another workload of the pair based on the required total capacity of the pair. The percentage compatibility determination module is configured to determine percentage compatibility of each pair of the plurality of candidate workloads running on the two or more candidate virtual machines based on the optimal sharing point. The colocation module is configured to colocate the two or more candidate virtual machines on the one or more physical infrastructures based on the optimal sharing point. The report generation module is configured to generate a co-locatability report.

In another example, a non-transitory computer readable medium for determining co-locatability of a plurality of virtual machines on one or more physical infrastructures is disclosed. In various examples the plurality of virtual machines host a plurality of workloads. The computer readable storage medium which is not a signal stores computer executable instructions for identifying variability of the plurality of workloads running on the plurality of virtual machines from time series data, determining workload capacity threshold of the plurality of workloads based on one or more service requirements, determining total capacity required by each pair of the plurality of workloads running on the two or more candidate virtual machines at a given time period to meet the one or more service requirements based on the workload capacity threshold, identifying an optimal sharing point for each workload of the pair of the plurality of workloads running on the two or more candidate virtual machines with respect to another workload of the pair based on the required total capacity of the pair and colocating the two or more candidate virtual machines on the one or more physical infrastructures based on the optimal sharing point. The computer executable instructions also include determining percentage compatibility of each pair of the plurality of workloads running on the two or more candidate virtual machines based on the optimal sharing point and generating a co-locatability report.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. Instead these simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for determining co-locatability of a plurality of virtual machines on one or more physical infrastructures. The plurality of virtual machines hosts a plurality of workloads. This involves identifying workloads which have high variability from the time series data and determining the workload capacity threshold of the identified workloads. Thereafter, the candidate workloads are selected among the identified workloads to colocate on a virtual machine based on the workload variability. After that, the total capacity required by each candidate workload pair to meet the service requirement is determined based on the workload capacity threshold. Then, an optimal sharing point of each workload of the pair with respect to the other workload of the pair is identified. Further, percentage compatibility of each workload pair is determined and finally, the candidate workloads are colocated based on the optimal sharing point and percentage compatibility.

Figure 1:
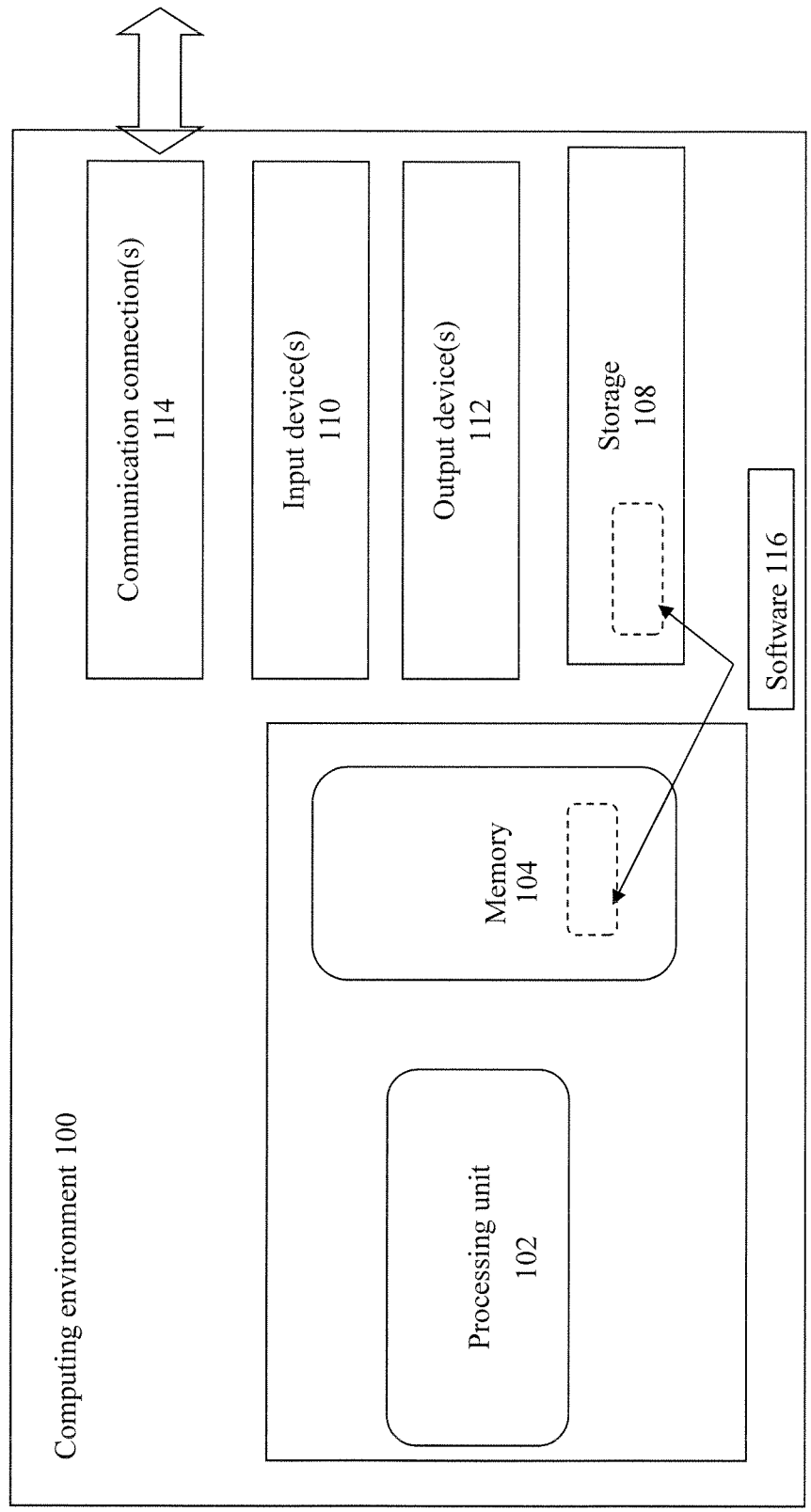
FIG. 1 is a computer architecture diagram illustrating a resource management computing device capable of implementing examples of the technology presented herein.

FIG. 1 is an example of a resource management computing device 100 in which embodiments, techniques, and technologies of this technology may be implemented. The resource management computing device 100 is not intended to suggest any limitation as to scope of use or functionality of the technology, as the technology may be implemented in other types and/or numbers of computing devices, systems and/or environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the resource management computing device 100 or other computing environment includes at least one central processing unit 102 and memory 104. The central processing unit 102 executes non-transitory computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. The resource management computing device 100 may have additional other types and/or numbers of features. For example, the resource management computing device 100 may include storage 108, one or more input devices 110, one or more output devices 112, and one or more communication connections 114. An interconnection mechanism (not shown) such as a bus, a controller, or a network, interconnects the components of the resource management computing device 100. Typically, operating system software (not shown) provides an operating environment for other software executing in the resource management computing device 100, and coordinates activities of the components of the resource management computing device 100.

Figure 2:
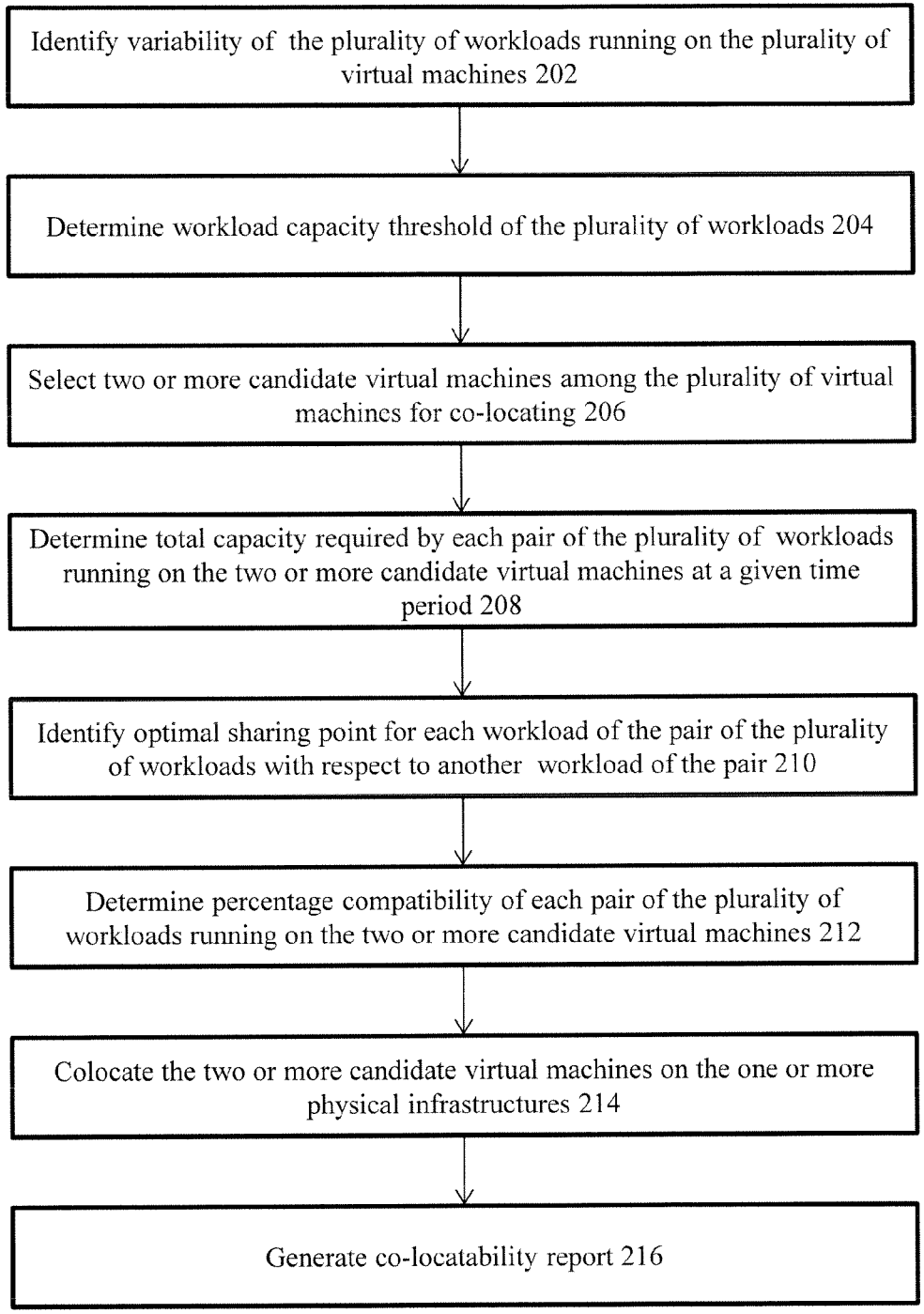
FIG. 2 is a flowchart of an example of a method for determining co-locatability of a plurality of virtual machines on one or more physical infrastructures, in accordance with an example of this technology.
Figure 3:
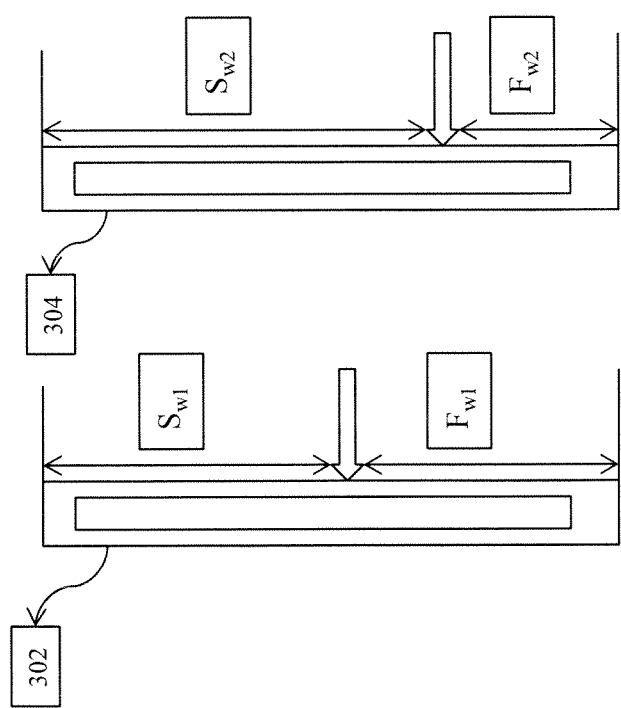
FIG. 3 is a diagram of two workloads having fixed and shared capacity, in accordance with an example of this technology.

FIG. 2 is a flowchart of an example of a method for determining co-locatability of a plurality of virtual machines on one or more physical infrastructures, in accordance with an embodiment of the present invention. In various embodiments of the present disclosure, virtual machines host a plurality of workloads and thus the term virtual machine and workload can be construed as synonyms in several instances in the present disclosure. The variability of workloads running on the virtual machines is determined from a time series data, as in step 202. One of the parameters for determining workload variability is to determine time overlapping behavior of the workloads. The overlap is a metric that reveals the extent of resource contention. The variability can be determined by using metrics such as Co-efficient of Variance (CoV). The CoV is equal to the standard deviation divided by the mean of the workload. The workload capacity threshold of all the workloads is determined based on service requirements or specifically on SLA, as in step 204. The workload capacity threshold of a workload at a given time period may vary from the fixed threshold value of that workload based on service requirements. The candidate virtual machines among all the virtual machines are selected to colocate based on the workload variability, as in step 206. There can be two scenarios based on the resource demand overlap. In one case, the overlap causes resource contentions leading to SLA violation and hence the workloads cannot share the underlying resources. In second case, the overlap does not cause resource contentions and hence there exists a potential to share resources. The decreasing CoV indicates better colocation efficiency. The total capacity required by each pair of the candidate workloads (i.e. workloads running on candidate VMs) at a given time period is determined based on the workload capacity threshold, as in step 208. The total capacity metric (TCM) represents the capacity needed by the candidate workloads together on the physical infrastructure which will meet each of their individual SLA. To calculate TCM, The time series data for the candidate workloads is taken and sum up matching the time stamp value. The workload capacity threshold is considered during calculating the TCM. The maximum obtained by this will be the TCM with 0% SLA violation tolerance. However, in case of less crucial workloads the SLA tolerance might be higher. The optimal sharing point of each candidate workload of the pair with respect to the other workload of that pair is identified based on the TCM, as in step 210. In various embodiments of the present disclosure, the sharing point represents a percentile of workload above which the workloads share capacity with each other. Each of the candidate workloads has a movable sharing point. The capacity below the sharing point is assigned as reserved capacity for the workload and the capacity above the point is obtained from the common shared capacity. In FIG. 3 $S_{w1}$ and $S_{w2}$ represents the sharing capacity of workload 1 and workload 2 respectively. The sharing point is obtained by optimizing the below equation:

$$TCM = F_{w1} + F_2 + \text{Max}(S_{w1}, S_{w2}) \quad (1)$$

Where, TCM is the Total Capacity Metric as calculated by summing up the time series data of the candidate workloads; $F_{w1}$ and $F_2$ are the capacities below the sharing point and these do not share with each other. In other words, these are reserved for the respective VMs; $S_{w1}$ and $S_{w2}$ are the capacities that each of the candidate workloads offers to share with each other.

Though the formula mentioned above is described for two workloads, it can be easily generalized for N workloads. One can take two workloads w1 and w2 and compute the TCM, then combine w1 and w2 to obtain a combined value of Fw and Sw. This consolidated workload is then compared with the third workload w3 to compute a new TCM. In this manner, one can compute the TCM of all the N workloads.

In this example, the present algorithm begins with a low sharing point which is then increased till the workload can sustain with the common shared capacity. The term workload sustenance means that it's processing SLA demands can be met with the allotted sharing. As the sharing point moves up and down the ratio of the reserved and shared capacity of the workload changes. When the sharing point is at a workload's maximum load, the entire capacity needed is exclusively reserved for it in the hardware. This is the worst case scenario as far as the resource sharing is concerned. Specifically this happens when the workloads are overlapping. Similarly, if the sharing point is at its lowest, no exclusive capacity is reserved for it. All the capacity it needs has to be obtained from sharing the infrastructure with others.

Referring back to FIG. 2, the percentage compatibility of each candidate workload pair is determined based on the optimal sharing point, as in step 212. Percentage compatibility metric (PCM) for a workload represent the extent of sharing possible between two workloads. The sharing between different pairs of workloads is often different. So, if a set of workloads are required to be placed on a set of physical infrastructure, then quantification of their compatibility is important and this is done by calculating the PCM. Higher compatibility is ranked by greater ability to share. The PCM can be calculated as follows:

$$PC_{(n,m)} = S_n / (F_n + S_n)$$

$$PC_{(m,n)} = S_m / (F_m + S_m)$$

$$PCM_{(m,n)} = PC_{(n,m)} * PC_{(m,n)}$$

Where, $PC_{(n,m)}$ represents the percentage compatibility of workload n with respect to workload m; $S_n$ represents sharing capacity of workload n; $F_n$ represents reserved capacity of workload n; $PC_{(m,n)}$ represents percentage compatibility of workload m with respect to workload n; $S_m$ represents sharing capacity of workload m; $F_m$ represents reserved capacity of workload m and $PCM_{(m,n)}$ represents percentage compatibility metrics of workload m with respect to workload n. Finally, the candidate virtual machines are colocated on one or more physical infrastructure based on optimal sharing point and optionally based on combination of optimal sharing point and percentage compatibility metric, as in step 214. The method further includes generating colocation report, as in step 216.

Figure 4:
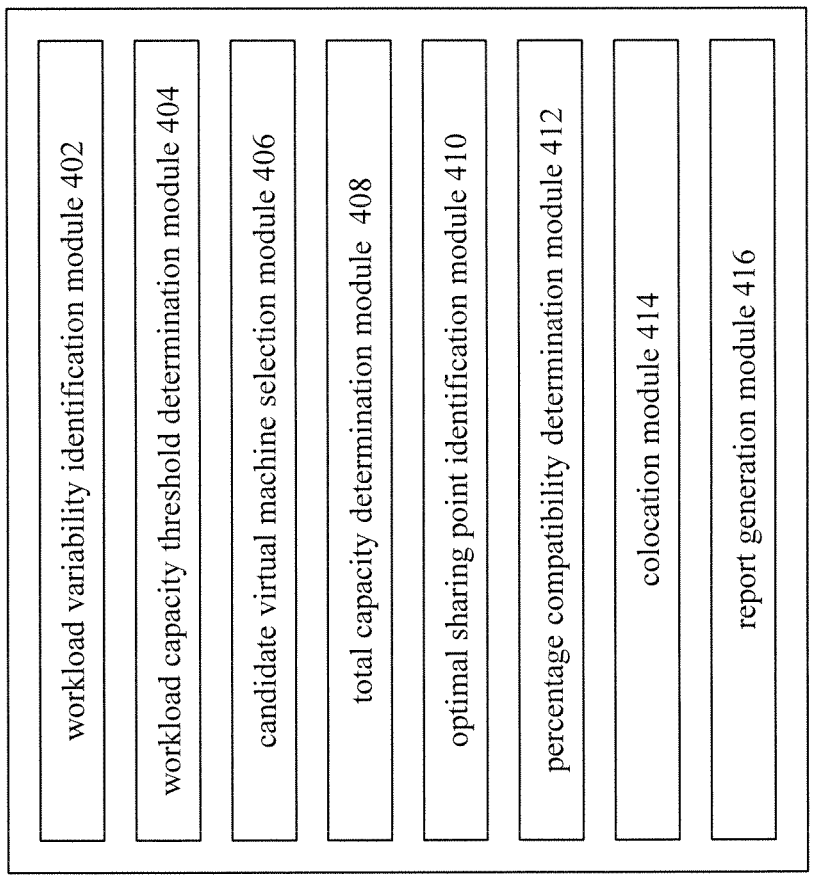
FIG. 4 is a block diagram of an example of a system that determines co-locatability of a plurality of virtual machines on one or more physical infrastructures, in accordance with an example of this technology.

FIG. 4 is a block diagram illustrating an example of a system for determining co-locatability of a plurality of virtual machines on one or more physical infrastructures, in accordance with an embodiment of the present invention. This example of a system includes a workload variability identification module (402), a workload capacity threshold determination module (404), a candidate virtual machine selection module (406), a total capacity determination module (408), an optimal sharing point identification module (410), a percentage compatibility determination module (412), a colocation module (414) and a report generation module (416). More particularly, the workload variability identification module (402) is configured to identify variability of the plurality of workloads running on the plurality of virtual machines from time series data. One of the parameters for determining workload variability is to determine time overlapping behavior of the workloads. The overlap is a metric that reveals the extent of resource contention. The variability can be determined by using metrics such as Co-efficient of Variance (CoV). The CoV is equal to the standard deviation divided by the mean of the workload. The workload capacity threshold determination module (404) is configured to determine workload capacity threshold of the plurality of workloads based on one or more service requirements or specifically on SLA. The candidate virtual machine selection module (406) is configured to select two or more candidate virtual machines among the plurality of virtual machines for co-locating based on the variability of the plurality of workloads running on the plurality of virtual machines. The decreasing CoV indicates better colocation efficiency. The total capacity determination module (408) is configured to determine total capacity required by each pair of the plurality of workloads running on the two or more candidate virtual machines at a given time period to meet the one or more service requirements based on the workload capacity threshold. The total capacity metric (TCM) represents the capacity needed by the candidate workloads together on the physical infrastructure which will meet each of their individual SLA. To calculate TCM, The time series data for the candidate workloads is taken and sum up matching the time stamp value. The workload capacity threshold is considered during calculating the TCM. The maximum obtained by this will be the TCM with 0% SLA violation tolerance. However, in case of less crucial workloads the SLA tolerance might be higher. The optimal sharing point identification module (410) is configured to identify an optimal sharing point for each workload of the pair of the plurality of workloads running on the two or more candidate virtual machines with respect to another workload of the pair based on the required total capacity of the pair. In various embodiments of the present disclosure, the sharing point represents a percentile of workload above which the workloads share capacity with each other. Each of the candidate workloads has a movable sharing point. The capacity below the sharing point is assigned as reserved capacity for the workload and the capacity above the point is obtained from the common shared capacity. The method of calculating the optimal sharing point is described in detail herein above with respect to FIG. 2. The percentage compatibility determination module (412) is configured to determine percentage compatibility of each pair of the plurality of candidate workloads running on the two or more candidate virtual machines based on the optimal sharing point. Percentage compatibility metric (PCM) for a workload represent the extent of sharing possible between two workloads. The sharing between different pairs of workloads is often different. So, if a set of workloads are required to be placed on a set of physical infrastructure, then quantification of their compatibility is important and this is done by calculating the PCM. Higher compatibility is ranked by greater ability to share. The method of determining PCM is described in detail herein above with respect to FIG. 2. The colocation module (414) is configured to colocate the two or more candidate virtual machines on the one or more physical infrastructures based on the optimal sharing point and optionally on the combination of the optimal sharing point and PCM. The report generation module (416) is configured to generate a co-locatability report.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for determining co-locatability of a plurality of virtual machines, the method comprising:

determining, by a virtual resource management computing device, a workload capacity threshold and a variability for a plurality of workloads on a corresponding plurality of virtual machines, wherein the determined variability is based at least in part on resource demand overlap data to indicate resource contention between the plurality of workloads on the corresponding plurality of virtual machines and the determined workload capacity threshold is based on a total workload capacity required by the plurality of virtual machines in a predetermined time period;

selecting, by the virtual resource management computing device, at least two of the plurality of virtual machines for co-location based on the determined variability of the plurality of workloads on the corresponding plurality of virtual machines;

determining, by the virtual resource management computing device, an optimal sharing point for the plurality of workloads corresponding to the at least two of the plurality of virtual machines, wherein the optimal sharing point is based on the total workload capacity required by the at least two of the plurality of virtual machines in the predetermined time period; and co-locating, by the virtual resource management computing device, the at least two of the plurality of virtual machines based on the determined optimal sharing point.

2. The method of claim 1, further comprising:

determining, by the virtual resource management computing device processor, a compatibility of the at least two of the plurality of workloads based on the optimal sharing point, wherein the compatibility is based on a maximum possible extent of sharing between the at least two of the plurality of workloads.

3. The method of claim 1, further comprising:

generating, by the virtual resource management computing device a co-locatability report based on the determined optimal sharing point.

4. The method of claim 1, further comprising:

determining, by the virtual resource management computing device, a co-efficient of variance based at least in part on a standard deviation and mean of a plurality of workload values corresponding to the plurality of workloads, wherein the variability of the plurality of workloads is based on time series data comprising the determined co-efficient of variance.

5. The method of claim 1, wherein the variability is based at least in part on time overlapping activity by the plurality of workloads.

6. The method as claimed in of claim 1, wherein the total capacity required by the plurality of virtual machines in a predetermined time period is based on one or more service level agreements.

7. A virtual resource management computing device comprising:

a processor;

a memory coupled to the processor which is configured to be capable of executing programmed instructions, which comprise the programmed instructions stored in the memory to:

determine a workload capacity threshold and a variability for a plurality of workloads on a corresponding plurality of virtual machines, wherein the determined variability is based at least in part on resource demand overlap data to indicate resource contention between the plurality of workloads on the corresponding plurality of virtual machines and the determined workload capacity threshold is based on a total workload capacity required by the plurality of virtual machines in a predetermined time period;

select at least two of the plurality of virtual machines for co-location based on the determined variability of the plurality of workloads on the corresponding plurality of virtual machines;
determine an optimal sharing point for the plurality of workloads corresponding to the at least two of the plurality of virtual machines, wherein the optimal sharing point is based on the total workload capacity required by the at least two of the plurality of virtual machines in the predetermined time period; and
co-locating the at least two of the plurality of virtual machines based on the determined optimal sharing point.

8. The device of claim 7, wherein the processor is further configured to be capable of executing the programmed instructions, which comprise the programmed instructions stored in the memory to:
determine a compatibility of the at least two of the plurality of workloads based on the optimal sharing point, wherein the compatibility is based on a maximum possible extent of sharing between the at least two of the plurality of workloads.

9. The device of claim 7, wherein the processor is further configured to be capable of executing the programmed instructions, which comprise the programmed instructions stored in the memory to:
generate a co-locatability report based on the determined optimal sharing point.

10. The device of claim 7, wherein the processor is further configured to be capable of executing the programmed instructions, which comprise the programmed instructions stored in the memory to:
determine a co-efficient of variance based at least in part on a standard deviation and mean of a plurality of workload values corresponding to the plurality of workloads, wherein the variability of the plurality of workloads is based on time series data comprising the determined co-efficient of variance.

11. The device of claim 7, wherein the variability is based at least in part on time overlapping activity by the plurality of workloads.

12. The device of claim 7, wherein the total capacity required by the plurality of virtual machines in a predetermined time period is based on one or more service level agreements.

13. The device of claim 7, wherein the optimal sharing point ensures maximum sharing possible between workloads of each pair of the plurality of workloads running on the two or more candidate virtual machines.

14. A non-transitory computer readable medium having stored thereon instructions for determining co-locatability of a plurality of virtual machines on one or more physical infrastructures, comprising machine executable code which when executed by at least one processor, causes the processor to perform steps comprising:
determining a workload capacity threshold and a variability for a plurality of workloads on a corresponding plurality of virtual machines, wherein the determined variability is based at least in part on resource demand overlap data to indicate resource contention between the plurality of workloads on the corresponding plurality of virtual machines and the determined workload capacity threshold is based on a total workload capacity required by the plurality of virtual machines in a predetermined time period;
selecting at least two of the plurality of virtual machines for co-location based on the determined variability of the plurality of workloads on the corresponding plurality of virtual machines;
determining an optimal sharing point for the plurality of workloads corresponding to the at least two of the plurality of virtual machines, wherein the optimal sharing point is based on the total workload capacity required by the at least two of the plurality of virtual machines in the predetermined time period; and
co-locating the at least two of the plurality of virtual machines based on the determined optimal sharing point.

15. The non-transitory computer readable medium of 14, further having stored thereon instructions that when executed by the processor cause the processor to perform steps further comprising:
generating a co-locatability report based on the determined optimal sharing point.

16. The non-transitory computer readable medium of claim 14, further having stored thereon instructions that when executed by the processor cause the processor to perform steps further comprising:
determining a co-efficient of variance based at least in part on a standard deviation and mean of a plurality of workload values corresponding to the plurality of workloads, wherein the variability of the plurality of workloads is based on the determined co-efficient of variance.

17. The non-transitory computer readable medium of claim 14, further having stored thereon instructions that when executed by the processor cause the processor to perform steps further comprising:
determining a compatibility of the at least two of the plurality of workloads based on the optimal sharing point, wherein the compatibility is based on a maximum possible extent of sharing between the at least two of the plurality of workloads.

18. The non-transitory computer readable medium of claim 14, wherein the variability is based at least in part on time overlapping activity by the plurality of workloads.

19. The non-transitory computer readable medium of claim 14, wherein the total capacity required by the plurality of virtual machines in a predetermined time period is based on one or more service level agreements.

20. The non-transitory computer readable medium of claim 14, further having stored thereon instructions that when executed by the processor cause the processor to perform steps further comprising:
detecting when resource demand overlap has occurred in the plurality of workloads, wherein the resource demand overlap data is based at least in part on the detected resource demand overlap; and
preventing sharing of resources between the plurality of virtual machines corresponding to the plurality of workloads when the resource demand overlap has been detected.

21. The method of claim 1, further comprising:
detecting, by the virtual resource management computing device, when resource demand overlap has occurred in the plurality of workloads, wherein the resource demand overlap data is based at least in part on the detected resource demand overlap; and
preventing, by the virtual resource management computing device, sharing of resources between the plurality of virtual machines corresponding to the plurality of workloads when the resource demand overlap has been detected.

22. The device of claim 7, wherein the processor is further configured to be capable of executing the programmed instructions, which comprise the programmed instructions stored in the memory to:
- detect when resource demand overlap has occurred in the plurality of workloads, wherein the resource demand overlap data is based at least in part on the detected resource demand overlap; and
- prevent sharing of resources between the plurality of virtual machines corresponding to the plurality of workloads when the resource demand overlap has been detected.

\* \* \* \* \*